United States Patent
Resendes

(10) Patent No.: US 6,706,804 B2
(45) Date of Patent: Mar. 16, 2004

(54) SILICA-FILLED ELASTOMERIC COMPOUNDS

(75) Inventor: Rui Resendes, Sarnia (CA)

(73) Assignee: Bayer Inc., Sarnia (CA)

( * ) Notice: Subject to any disclaimer, the term of this patent is extended or adjusted under 35 U.S.C. 154(b) by 0 days.

(21) Appl. No.: 10/341,218

(22) Filed: Jan. 13, 2003

(65) Prior Publication Data

US 2003/0171478 A1 Sep. 11, 2003

(30) Foreign Application Priority Data

Jan. 17, 2002 (CA) ............................................. 2368363

(51) Int. Cl.$^7$ ............................................. C08K 5/5445
(52) U.S. Cl. ........................ 524/552; 524/262; 524/188; 524/247
(58) Field of Search ................................ 524/552, 262, 524/188, 247

(56) References Cited

U.S. PATENT DOCUMENTS 5,872,176 A * 2/1999 Hergenrother et al. ...... 524/494
5,939,484 A * 8/1999 Araki et al. ................. 524/492

FOREIGN PATENT DOCUMENTS

| CA | 2293149 | 6/2001 |
|---|---|---|
| CA | 2339080 | 9/2002 |
| EP | 0 857 752 | 8/1998 |
| EP | 1 111 004 | 6/2001 |

OTHER PUBLICATIONS

Rubber Technology, 3$^{rd}$ edition (2), (month unavailable) 1987, pp. 20–58, Howard L. Stephens, "The Compounding and Vulcanization of Rubber".

* cited by examiner

*Primary Examiner*—Margaret G. Moore
(74) *Attorney, Agent, or Firm*—Joseph C. Gil; Jennifer R. Seng

(57) ABSTRACT

The present invention provides a process for preparing a filled halobutyl elastomer, which comprises mixing a halobutyl elastomer, mineral filler and a silazane compound or mixture of a silazane compound and an additive which contains at least one hydroxyl group and at least one substituents which bears a basic amine group, and curing the filled elastomer with sulfur or other curative systems. The present invention has the advantages of (a) not evolving alcohol either during the manufacture or subsequent use of the article manufactured from the compound, (b) improving the scorch safety of filled halobutyl elastomer compounds which employ silica as the mineral filler and a the additive containing at least one hydroxyl group and a functional group containing a basic amine as a dispersing aid and (c) significantly reducing the cost of the compound compared to analogous compounds currently known in the art.

22 Claims, 11 Drawing Sheets

US 6,706,804 B2

SILICA-FILLED ELASTOMERIC COMPOUNDS

FIELD OF THE INVENTION

The present invention relates to silica-filled halogenated butyl elastomers, such as bromobutyl elastomers (BIIR).

BACKGROUND OF THE INVENTION

It is known that reinforcing fillers such as carbon black and silica greatly improve the strength and fatigue properties of elastomeric compounds. It is also known that chemical interaction occurs between the elastomer and the filler. For example, good interaction between carbon black and highly unsaturated elastomers such as polybutadiene (BR) and styrene butadiene copolymers (SBR) occurs because of the large number of carbon-carbon double bonds present in these copolymers. Butyl elastomers may have only one tenth, or fewer, of the carbon-carbon double bonds found in BR or SBR, and compounds made from butyl elastomers are known to interact poorly with carbon black. For example, a compound prepared by mixing carbon black with a combination of BR and butyl elastomers results in domains of BR, which contain most of the carbon black, and butyl domains which contain very little carbon black. It is also known that butyl compounds have poor abrasion resistance.

Canadian Patent Application 2,293,149 shows that it is possible to produce filled butyl elastomer compositions with improved properties by combining halobutyl elastomers with silica and specific silanes. These silanes act as dispersing and bonding agents between the halogenated butyl elastomer and the filler. However, one disadvantage of the use of silanes is the evolution of alcohol during the process of manufacture and potentially during the use of the manufactured article produced by this process. Additionally, silanes significantly increase the cost of the resulting manufactured article.

Co-pending Canadian Patent Application 2,339,080 discloses filled halobutyl elastomeric compounds containing certain organic compounds having at least one basic nitrogen-containing group and at least one hydroxyl group enhance the interaction of halobutyl elastomers with carbon-black and mineral fillers, resulting in improved compound properties such as tensile strength and abrasion (DIN).

SUMMARY OF THE INVENTION

The present invention provides a process for preparing compositions containing halobutyl elastomers, at least one mineral filler and at least one silazane compound. The invention also provides filled halobutyl elastomer compositions comprising halobutyl elastomers, at least one mineral filler and at least one silazane compound. Preferably, the present invention provides a means to produce such filled compositions without the evolution of alcohol, and at significantly reduced cost, compared to processes known in the art.

Surprisingly, it has been discovered that silazane compounds enhance the interaction of halobutyl elastomers with mineral fillers, resulting in improved compound properties such as tensile strength and abrasion (DIN). Silazane compounds are believed to disperse and bond the silica to the halogenated elastomers.

Accordingly, the present invention also provides a process, which includes mixing a halobutyl elastomer with at least one mineral filler, in the presence of at least one silazane compound, and curing the resulting filled halobutyl elastomer. According to the present invention, the resulting filled halobutyl elastomer has improved properties.

Additionally, it has been found that mixtures of silazane compounds and an additive containing at least one hydroxyl group and a functional group containing a basic amine enhance the interaction of halobutyl elastomers with mineral fillers, resulting in improved compound properties such as tensile strength and abrasion resistance (DIN).

Accordingly, the present invention also provides a process which includes mixing a halobutyl elastomer with at least one mineral filler, in the presence of at least one silazane compound and one additive containing at least one hydroxyl group and a functional group containing a basic amine, and curing the resulting filled halobutyl elastomer. The resulting composition, having improved properties, forms another aspect of the invention.

The halobutyl elastomer, which is admixed with the mineral filler and the silazane compound or the mixture of silazane compound and an additive containing at least one hydroxy group and a functional group containing a basic amine, may also be in a mixture with another elastomer or elastomeric compound. The halobutyl elastomer should constitute more than 5% of any such mixture. Preferably, the halobutyl elastomer should constitute at least 10% of any such mixture. In some cases it is preferred not to use mixtures but to use the halobutyl elastomer as the sole elastomer. If mixtures are to be used, the other elastomer may be, for example, natural rubber, polybutadiene, styrene-butadiene or poly-chloroprene or an elastomer compound containing one or more of these elastomers.

The filled halobutyl elastomer can be cured to obtain a product, which has improved properties, such as improved abrasion resistance, rolling resistance and traction. Curing can be effected with sulfur. The preferred amount of sulfur is in the range of from 0.3 to 2.0 parts by weight per hundred parts of rubber. An activator, for example zinc oxide, may also be used, in an amount in the range of from 0.5 parts to 2 parts by weight. Other ingredients, for instance stearic acid, antioxidants, or accelerators may also be added to the elastomer prior to curing. Sulphur curing is then effected in any known manner. See, for example, "Rubber Technology", chapter 2, "The Compounding and Vulcanization of Rubber" ($3^{rd}$ ed., Chapman & Hall, 1995).

Other curatives known to cure halobutyl elastomers may also be used. Such known curatives include bis dieneophiles. Suitable bis dieneophiles include m-phenyl-bis-maleinimide and m-phenylene-bis-maleimide (HVA2). Other suitable compounds that are known to cure halobutyl elastomers include phenolic resins, amines, amino acids, peroxides, zinc oxide and the like. Combinations of the aforementioned curatives may also be used.

The mineral filled halobutyl elastomer of the present invention can also be admixed with other elastomers or elastomeric compounds before it is subjected to curing with sulphur. This is discussed further below.

DETAILED DESCRIPTION OF THE INVENTION

Figure 1:
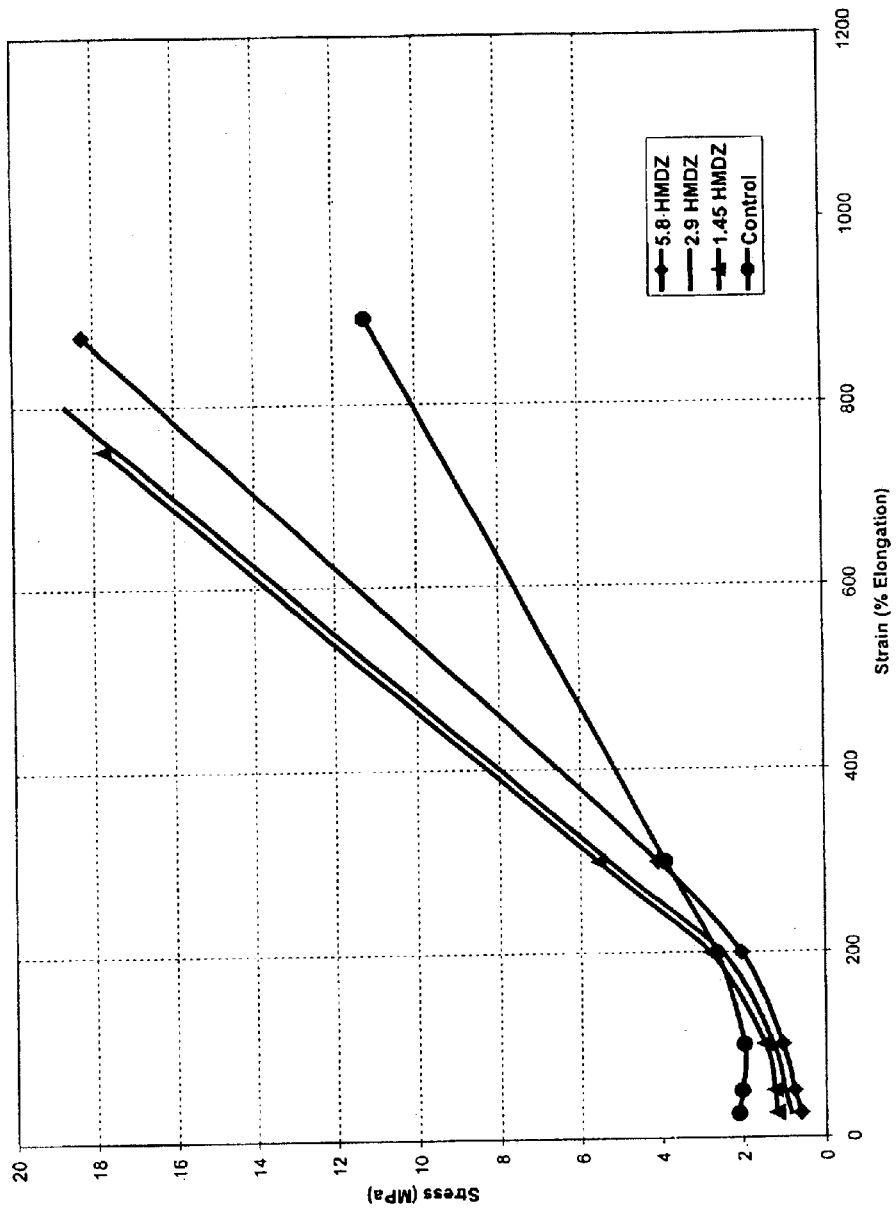
FIG. 1 is a graph of the stress/strain curves of filled halobutyl elastomer compounds, which contain HMDZ, according to the present invention, and to a filled halobutyl elastomer compound which does not contain HMZD.

The phrase "halobutyl elastomer(s)" as used herein refers to a chlorinated or brominated butyl elastomer. Brominated butyl elastomers are preferred, and the present invention is illustrated, by way of example, with reference to bromobutyl elastomers. It should be understood, however, that the present invention extends to the use of chlorinated butyl elastomers.

Halobutyl elastomers suitable for use in the present invention include, but are not limited to, brominated butyl elastomers. Such elastomers may be obtained by bromination of butyl rubber, which is a copolymer of an isoolefin, usually isobutylene and a co-monomer that is usually a $C_4$ to $C_6$ conjugated diolefin, preferably isoprene and brominated isobutene-isoprene-copolymers (BIIR). Co-monomers other than conjugated diolefins can be used, such as alkyl-substituted vinyl aromatic co-monomers which includes $C_1$–$C_4$-alkyl substituted styrene. An example of a halobutyl elastomer which is commercially available is brominated isobutylene methylstyrene copolymer (BIMS) in which the co-monomer is p-methylstyrene.

Brominated butyl elastomers typically contain in the range of from 0.1 to 10 weight percent, preferably 0.5 to 5 weight percent of repeating units derived from diolefin, preferably isoprene, and in the range of from 90 to 99.9 weight percent, preferably 95 to 99.5 weight percent of repeating units derived from isoolefin, preferably isobutylene, based upon the hydrocarbon content of the polymer, and in the range of from 0.1 to 9 weight percent, preferably 0.75 to 2.3 weight percent and more preferably from 0.75 to 2.3 weight percent bromine, based upon the bromobutyl polymer. A typical bromobutyl polymer has a molecular weight, expressed as the Mooney viscosity according to DIN 53 523 (ML 1+8 at 125° C.), in the range of from 25 to 60.

A stabilizer may be added to the brominated butyl elastomer. Suitable stabilizers include calcium stearate and epoxidized soy bean oil, preferably used in an amount in the range of from 0.5 to 5 parts by weight per 100 parts by weight of the brominated butyl rubber (phr).

Examples of suitable brominated butyl elastomers include Bayer Bromobutyl 2030, Bayer Bromobutyl 2040 (BB2040), and Bayer Bromobutyl X2 commercially available from Bayer Corporation. Bayer BB2040 has a Mooney viscosity (ML 1+8@125° C.) of 39±4, a bromine content of 2.0±0.3 wt % and an approximate molecular weight of 500,000 grams per mole.

The brominated butyl elastomer used in the process of the present invention may also be a graft copolymer of a brominated butyl rubber and a polymer based upon a conjugated diolefin monomer. Co-pending Canadian Patent Application 2,279,085 is directed towards a process for preparing such graft copolymers by mixing solid brominated butyl rubber with a solid polymer based on a conjugated diolefin monomer which also includes some C—S—(S)$_n$—C bonds, where n is an integer from 1 to 7, the mixing being carried out at a temperature greater than 50° C. and for a time sufficient to cause grafting. The bromobutyl elastomer of the graft copolymer can be any of those described above. The conjugated diolefins that can be incorporated in the graft copolymer generally have the structural formula:

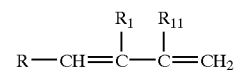

wherein R is a hydrogen atom or an alkyl group containing from 1 to 8 carbon atoms and wherein $R_1$ and $R_{11}$ can be the same or different and are selected from hydrogen atoms or alkyl groups containing from 1 to 4 carbon atoms. Suitable conjugated diolefins include 1,3-butadiene, isoprene, 2-methyl-1,3-pentadiene, 4-butyl-1,3-pentadiene, 2,3-dimethyl-1,3-pentadiene 1,3-hexadiene, 1,3-octadiene, 2,3-dibutyl-1,3-pentadiene, 2-ethyl-1,3-pentadiene, 2-ethyl-1,3-butadiene and the like. Conjugated diolefin monomers containing from 4 to 8 carbon atoms are preferred, 1,3-butadiene and isoprene being more preferred.

The polymer based on a conjugated diene monomer can be a homopolymer, or a copolymer of two or more conjugated diene monomers, or a copolymer with a vinyl aromatic monomer.

The vinyl aromatic monomers, which can optionally be used, should be copolymerizable with the conjugated diolefin monomers being employed. Generally, any vinyl aromatic monomer, which is known to polymerize with organo alkali metal initiators, can be used. Such vinyl aromatic monomers usually contain in the range of from 8 to 20 carbon atoms, preferably from 8 to 14 carbon atoms. Examples of suitable vinyl aromatic monomers include styrene, alpha-methyl styrene, various alkyl styrenes including p-methylstyrene, p-methoxy styrene, 1-vinylnaphthalene, 2-vinyl naphthalene, 4-vinyl toluene and the like. Styrene is preferred for copolymerization with 1,3-butadiene alone or for terpolymerization with both 1,3-butadiene and isoprene.

According to the present invention, halogenated butyl elastomer may be used alone or in combination with other elastomers such as:

| | |
|---|---|
| BR | polybutadiene; |
| ABR | butadiene/$C_1$–$C_4$ alkyl acrylate copolymers; |
| CR | polychloroprene; |
| IR | polyisoprene; |
| SBR | styrene/butadiene copolymers with styrene contents of 1 to 60, preferably 20 to 50 wt. %; |
| IIR | isobutylene/isoprene copolymers; |
| NBR | butadiene/acrylonitrile copolymers with acrylonitrile contents of 5 to 60, preferably 10 to 40 wt. %; |
| HNBR | partially hydrogenated or completely hydrogenated NBR; or |
| EPDM | ethylene/propylene/diene copolymers. |

Fillers according to the present invention are composed of particles of a mineral, suitable fillers include silica, silicates, clay (such as bentonite), gypsum, alumina, titanium dioxide, talc and the like, as well as mixtures thereof.

Further examples of suitable fillers include:
- highly disperse silicas, prepared e.g. by the precipitation of silicate solutions or the flame hydrolysis of silicon halides, with specific surface areas of 5 to 1000, preferably 20 to 400 $m^2/g$ (BET specific surface area), and with primary particle sizes of 10 to 400 nm; the silicas can optionally also be present as mixed oxides with other metal oxides such as Al, Mg, Ca, Ba, Zn, Zr and Ti;
- synthetic silicates, such as aluminum silicate and alkaline earth metal silicate;
- magnesium silicate or calcium silicate, with BET specific surface areas of 20 to 400 $m^2/g$ and primary particle diameters of 10 to 400 nm;
- natural silicates, such as kaolin and other naturally occurring silica;
- glass fibers and glass fiber products (matting, extrudates) or glass microspheres;
- metal oxides, such as zinc oxide, calcium oxide, magnesium oxide and aluminum oxide;
- metal carbonates, such as magnesium carbonate, calcium carbonate and zinc carbonate;
- metal hydroxides, e.g. aluminum hydroxide and magnesium hydroxide or combinations thereof.

Because these mineral particles have hydroxyl groups on their surface, rendering them hydrophilic and oleophobic, it is difficult to achieve good interaction between the filler particles and the butyl elastomer. For many purposes, the preferred mineral is silica, especially silica prepared by the carbon dioxide precipitation of sodium silicate.

Dried amorphous silica particles suitable for use as mineral fillers in accordance with the present invention have a mean agglomerate particle size in the range of from 1 to 100 microns, preferably between 10 and 50 microns and more preferably between 10 and 25 microns. It is preferred that less than 10 percent by volume of the agglomerate particles are below 5 microns or over 50 microns in size. A suitable amorphous dried silica has a BET surface area, measured in accordance with DIN (Deutsche Industrie Nor) 66131, of between 50 and 450 square meters per gram and a DBP absorption, as measured in accordance with DIN 53601, of between 150 and 400 grams per 100 grams of silica, and a drying loss, as measured according to DIN ISO 787/11, of from 0 to 10 percent by weight. Suitable silica fillers are commercially available under the trademarks HiSil 210, HiSil 233 and HiSil 243 available from PPG Industries Inc. Also suitable are Vulkasil S and Vulkasil N, commercially available from Bayer AG.

Mineral fillers can also be used in combination with known non-mineral fillers, such as
- carbon blacks; suitable carbon blacks are preferably prepared by the lamp black, furnace black or gas black process and have BET specific surface areas of 20 to 200 $m^2/g$, for example, SAF, ISAF, HAF, FEF or GPF carbon blacks; or
- rubber gels, preferably those based on polybutadiene, butadiene/styrene copolymers, butadiene/acrylonitrile copolymers and polychloroprene.

Non-mineral fillers are not normally used as filler in the halobutyl elastomer compositions of the present invention, but in some embodiments they may be present in an amount up to 40 phr. It is preferred that the mineral filler should constitute at least 55% by weight of the total amount of filler. If the halobutyl elastomer composition of the present invention is blended with another elastomeric composition, that other composition may contain mineral and/or non-mineral fillers.

According to the present invention the silazane compound can have one or more silazane group, such as a disilazane. Organic silazane compounds are preferred. Suitable silazane compounds include but are not limited to hexamethyldisilazane, heptamethyldisilazane, 1,1,3,3-tetramethyldisilazane, 1,3-bis(chloromethyl) tetramethyldisilazane, 1,3-divinyl-1,1,3,3-tetramethyldisilazane, and 1,3-diphenyltetramethyl-disilazane.

Examples of additives, which give enhanced physical properties to mixtures of halobutyl elastomers, filler and organic silazanes, include proteins, aspartic acid, 6-aminocaproic acid, diethanolamine and triethanolamine. Preferably, the additive containing at least one hydroxyl group and a functional group containing a basic amine should also contain a primary alcohol group and an amine group separated by methylene bridges, which may be branched. Such compounds have the general formula HO—A—$NH_2$; wherein A is a C1 to C20 alkylene group, which may be linear or branched.

More preferably, the number of methylene groups between the two functional groups should be in the range of from 1 to 4. Examples of preferred additives include monoethanolamine and N,N-dimethyaminoalcohol.

The amount of filler to be incorporated into the halobutyl elastomer can vary between wide limits. Typical amounts of filler range from 20 parts to 250 parts by weight, preferably from 30 parts to 100 parts, more preferably from 40 to 80 parts per hundred parts of elastomer. The amount of the silazane compound is typically in the range of from 0.5 to 10 parts per hundred parts of elastomer, preferably of from 1 to 6, more preferably of from 2 to 5 parts per hundred parts of elastomer. The amount of the additive containing at least one hydroxyl group and a functional group containing a basic amine used in conjunction with the silazane compound is typically in the range of from 0.5 to 10 parts per hundred parts of elastomer, preferably of from 1 to 3 parts per hundred parts of elastomer.

Furthermore up to 40 parts of processing oil, preferably from 5 to 20 parts, per hundred parts of elastomer, may be present. Further, a lubricant, for example a fatty acid such as stearic acid, may be present in an amount up to 3 parts by weight, more preferably in an amount up to 2 parts by weight.

The halobutyl elastomer(s), filler(s) and silazane(s) or silazane/additive containing at least one hydroxyl group and a functional group containing a basic amine mixtures are mixed together, suitably at a temperature in the range of from 25 to 200° C. It is preferred that the mixing temperature be greater than 60° C., and a temperature in the range of from 90 to 150° C. is preferred. Normally the mixing time does not exceed one hour; a time in the range from 2 to 30 minutes is usually adequate. The mixing is suitably carried out on a two-roll mill mixer, which provides good dispersion of the filler within the elastomer. Mixing may also be carried out in a Banbury mixer, or in a Haake or Brabender miniature internal mixer. An extruder also provides good mixing, and has the further advantage that it permits shorter mixing times. It is also possible to carry out the mixing in two or more stages. Further, the mixing can be carried out in different apparatuses, for example one stage may be carried out in an internal mixer and another in an extruder.

The enhanced interaction between the filler and the halobutyl elastomer results in improved properties for the filled elastomer. These improved properties include higher tensile strength, higher abrasion resistance, lower permeability and better dynamic properties. These render the filled elastomers suitable for a number of applications, including, but not limited to, use in tire treads and tire sidewalls, tire innerliners, tank linings, hoses, rollers, conveyor belts, curing bladders, gas masks, pharmaceutical enclosures and gaskets.

According to the present invention, a bromobutyl elastomer, silica particles, a silazane compound or a silazane/additive containing at least one hydroxyl group and a functional group containing a basic amine mixture and, optionally, a processing oil extender are mixed on a two-roll mill at a nominal mill temperature of 25° C. The mixed compound is then placed on a two-roll mill and mixed at a temperature above 60° C. It is preferred that the temperature of the mixing is not too high, and more preferably does not exceed 150° C., since higher temperatures may cause curing to proceed undesirably far and thus impede subsequent processing. The product of mixing these four ingredients at a temperature not exceeding 150° C. is a compound which has good stress/strain properties and which can be readily processed further on a warm mill with the addition of curatives.

The filled halobutyl rubber compositions of the present invention, and preferably filled bromobutyl rubber compositions have many uses, preferably in tire tread compositions. Important features of a tire tread composition are that it shall have low rolling resistance, good traction, particularly in the wet, and good abrasion resistance so that it is resistant to wear. Compositions of the present invention display these desirable properties. Thus, an indicator of traction is tan δ at 0° C., with a high tan δ at 0° C. correlating with good traction. An indicator of rolling resistance is tan δ at 60° C., with a low tan δ at 60° C. correlating with low rolling resistance. Rolling resistance is a measure of the resistance to forward movement of the tire, and low rolling resistance is desired to reduce fuel consumption. Low values of loss modulus at 60° C. are also indicators of low rolling resistance. As is demonstrated in the examples below, compositions of the present invention display high tan δ at 0° C., low tan δ at 60° C. and low loss modulus at 60° C.

The invention is further illustrated but is not intended to be limited by the following examples in which all parts and percentages are by weight unless otherwise specified.

EXAMPLES

Description of Tests:

Abrasion resistance: DIN 53–516 (60 grit Emery paper)

Dynamic Property Testing: Dynamic testing (tan δ at 0° C. and 60° C., Loss modulus at 60° C.) were carried out using the GABO. The GABO is a dynamic mechanical analyzer for characterizing the properties of vulcanized elastomeric materials. The dynamic mechanical properties give a measure of traction with the best traction usually obtained with high values of tan δ at 0° C. Low values of tan δ at 60° C., and in particular, low loss moduli at 60° C. are indicators of low rolling resistance. RPA measurements were obtained with the use of an Alpha Technologies RPA 2000 operating at 100° C. at a frequency of 6 cpm. Strain sweeps were measured at strains of 0.1, 0.2, 0.5, 1, 2, 5, 10, 20, 50 and 90°.

Cure rheometry: ASTM D 52–89 MDR2000E Rheometer at 1° arc and 1.7 Hz

Description of Ingredients and General Mixing Procedure:

Hi-Sil 233—silica—a product of PPG

Sunpar® 2280 —paraffinic oil produced by Sun Oil

Maglite® D —magnesium oxide produced by CP Hall

The brominated butyl elastomer (in all cases commercial Bayer Bromobutyl 2030) silica, oil and silazane or silazane/additive containing at least one hydroxyl group and a functional group containing a basic amine mixture were mixed on either:

i) a tangential Banbury internal mixer operating at 77 rpm while being thermally regulated with the use of a Mokon set to 40° C. Compounds were mixed for a total of 6 minutes. The final rubber temperature ranged from 140° C. to 180° C.

ii) a 6"×12" two-roll mill with the rolls running at 24 and 32 rpm. The mill roll was set at 25° C., with a total incorporation time of 10 minutes. The mixed compounds were then "heat treated" for a further 10 minutes with the roll temperature at 110° C. The final rubber temperature was 125° C.

Curatives were then added to the cooled sample with the mill at 25° C.

Example 1

The affect of silazane incorporation into halogenated butyl elastomer/silica compounds was investigated via the formulation of several compounds of which hexamethyidisilazane (HMDZ) was incorporated as the silazane compound. For comparison, a halogenated butyl elastomer/silica compound with no silazane was also prepared as a control compound.

Brominated isoprene isobutylene rubber (BIIR) was mixed with the silazane and 60 parts per hundred rubber (phr) of silica filler (HiSil 233) in a tangential Banbury mixer under the mixing conditions described above. Identical curative ingredients (1 phr of stearic acid, 0.5 phr of sulfur, and 1.5 phr of ZnO) were then added on a cool mill to each of the compounds. The compounds were then cured for either $t_c(90)+10$ minutes at 170° C. (for DIN Abrasion testing) or $t_c(90)+5$ minutes at 170° C. and tested. Tables 1 and 2 gives the product compositions, and physical property data for the HMDZ containing compounds and for a compound containing no filler bonding agent.

Figure 2:
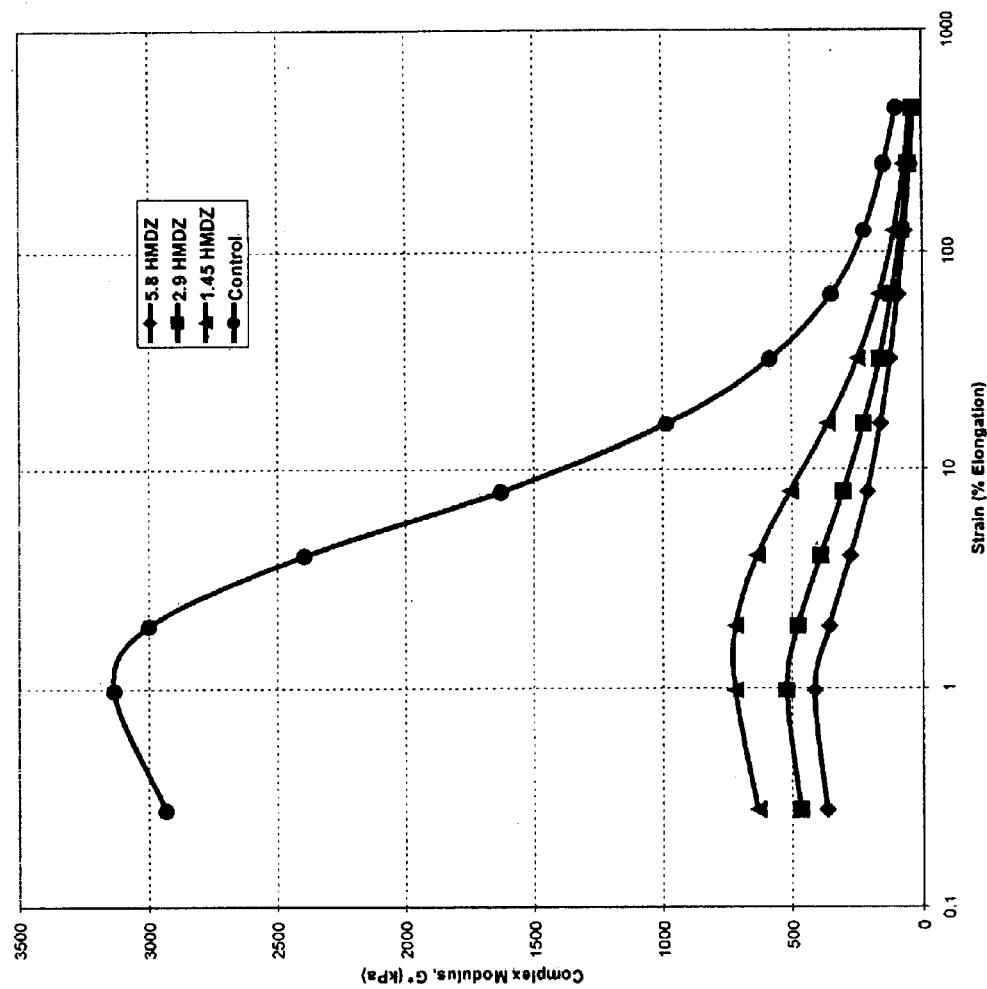
FIG. 2 is a graph of the complex modulus/strain curves of filled halobutyl elastomer compounds, which contain HMDZ, according to the present invention, and to a filled halobutyl elastomer compound which does not contain HMZD.

The data in Table 1 shows the effect of adding HMDZ to assist in the bonding and dispersion of the siliceous filler in the brominated butyl elastomer. The ratio M300/M100 is commonly used as a relative measure of the degree of filler reinforcement in an elastomer compound (the higher the ratio the higher the reinforcement). While the M300/M100 for compound 1d with no HMDZ (example 1d will here in be used as the control compound for the remaining examples) is 1.97 the M300/M100 values for the compounds containing HMDZ ranges from 3.76 to 4.13. (See FIG. 1). The value of the complex modulus (G*, MPa) at low strains obtained from RPA measurements is commonly used as a relative measure of the degree of filler reinforcement in an elastomer compound (the lower the value of G*, the higher the degree of filler dispersion). From the data in Table 1, it is clear that a significant improvement in filler dispersion is observed on the addition of HMDZ to brominated butyl rubber/silica compounds. Specifically, for the control compound, the G* value is 2934 MPa while for the compounds containing HMDZ, this value ranges from 365 to 631 MPa (See FIG. 2).

Figure 3:
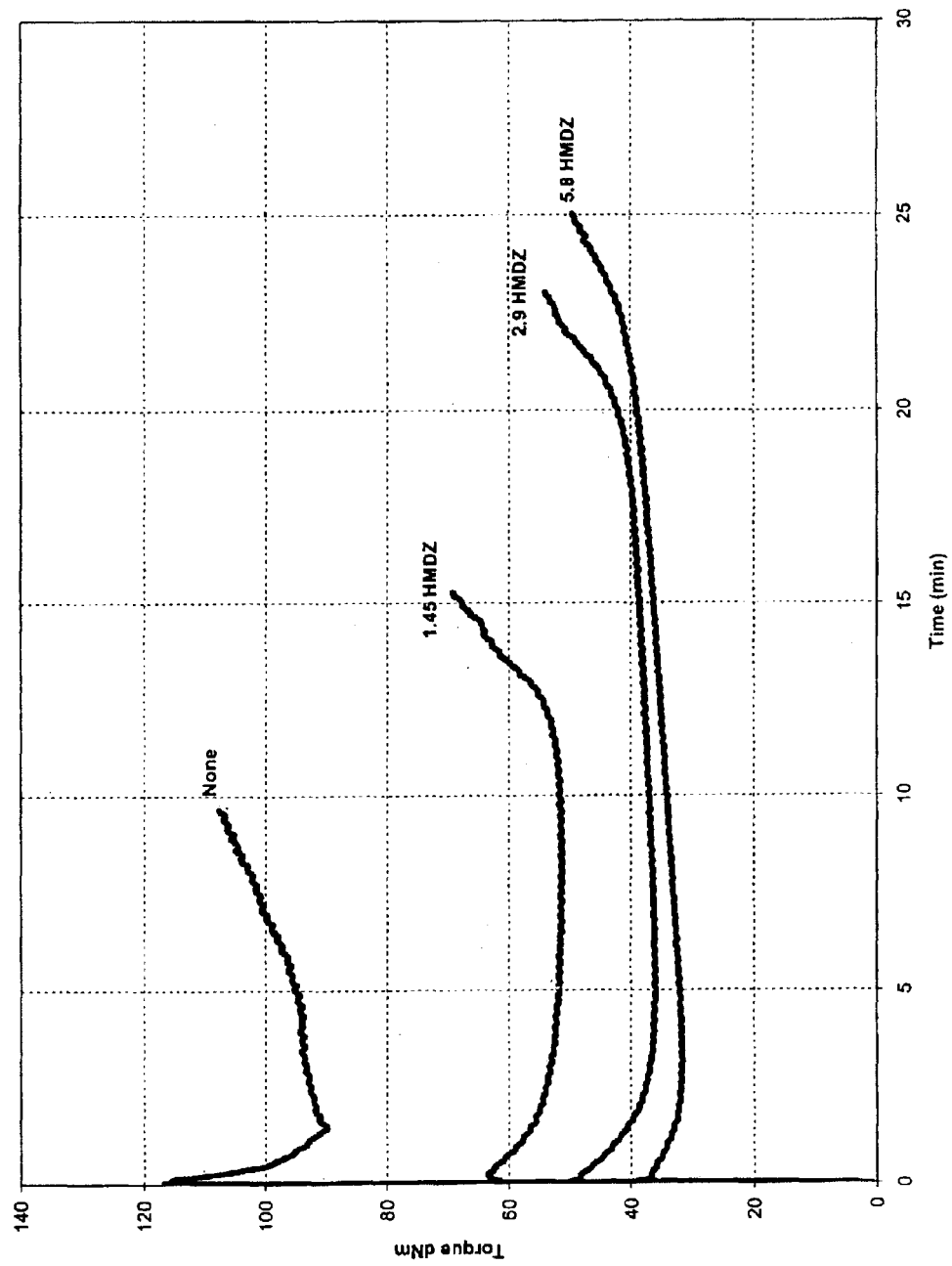
FIG. 3 is a graph of the time versus the torque for filled halobutyl elastomer compounds, which contain HMDZ, according to the present invention, and to a filled halobutyl elastomer compound which does not contain HMZD.

Importantly, the data in Table 1 also shows that the improvement in filler dispersion and bonding does not effect the overall processability of the resulting compound. On examination of the Mooney Scorch data presented in Table 1 and FIG. 3, it can be seen that the incorporation of HMDZ into these brominated butyl rubber/silica compounds significantly improves the scorch safety (i.e. increase in the t03 times).

With respect to the performance of these compounds in tires treads, tan δ values at 0° C. and 60° C. as well as loss modulus (G", MPa) values at 60° C. are quoted. Specifically, high tan δ values at 0° C. are indicative of good traction while low values of tan δ at 60° C. and low values of G" at 60° C. are indicative of low rolling resistance. From the data presented in Table 2, the positive effects of HMDZ on the tan δ value at 0° C. and the G" value at 60° C. are seen. While the control compound possesses a tan δ (0° C.) of 0.23 and a G" (60° C.) of 3.33 MPa, compounds containing HMDZ possess tan δ (0° C.) values ranging from 0.49 to 0.88 and G" (60° C.) values ranging from 0.93 to 1.98 MPa.

Example 2

Co-pending Canadian Patent Application 2,339,080 illustrates the utility of additives containing at least one hydroxyl group and at least one substituent bearing a basic amine group in the dispersion and reinforcement of silica in halogenated butyl elastomer compounds. Given the positive effect seen through the introduction of HMDZ into halogenated butyl elastomer/silica compounds, mixtures of HMDZ and the additive containing at least one hydroxyl group and a functional group containing a basic amines of the type described above were examined. This example investigates the effect of incorporating mixtures of HMDZ and monoethanolamine (MEA) into halogenated butyl elastomer/silica compounds prepared in a Banbury internal mixer.

Brominated isoprene isobutylene rubber (BIIR) was mixed with the additives and 60 parts per hundred rubber (phr) of silica filler (HiSil 233) in a tangential Banbury mixer under the mixing conditions described above. Identical curative ingredients (1 phr of stearic acid, 0.5 phr of sulfur, and 1.5 phr of ZnO) were then added on a cool mill to each of the compounds. The compounds were then cured for either $t_c(90)+10$ minutes at 170° C. (for DIN Abrasion testing) or $t_c(90)+5$ minutes at 170° C. and tested. Tables 3 and 4 gives the product compositions, and physical property data for the HMDZ/MEA containing compounds and for a compound containing only MEA.

Figure 4:
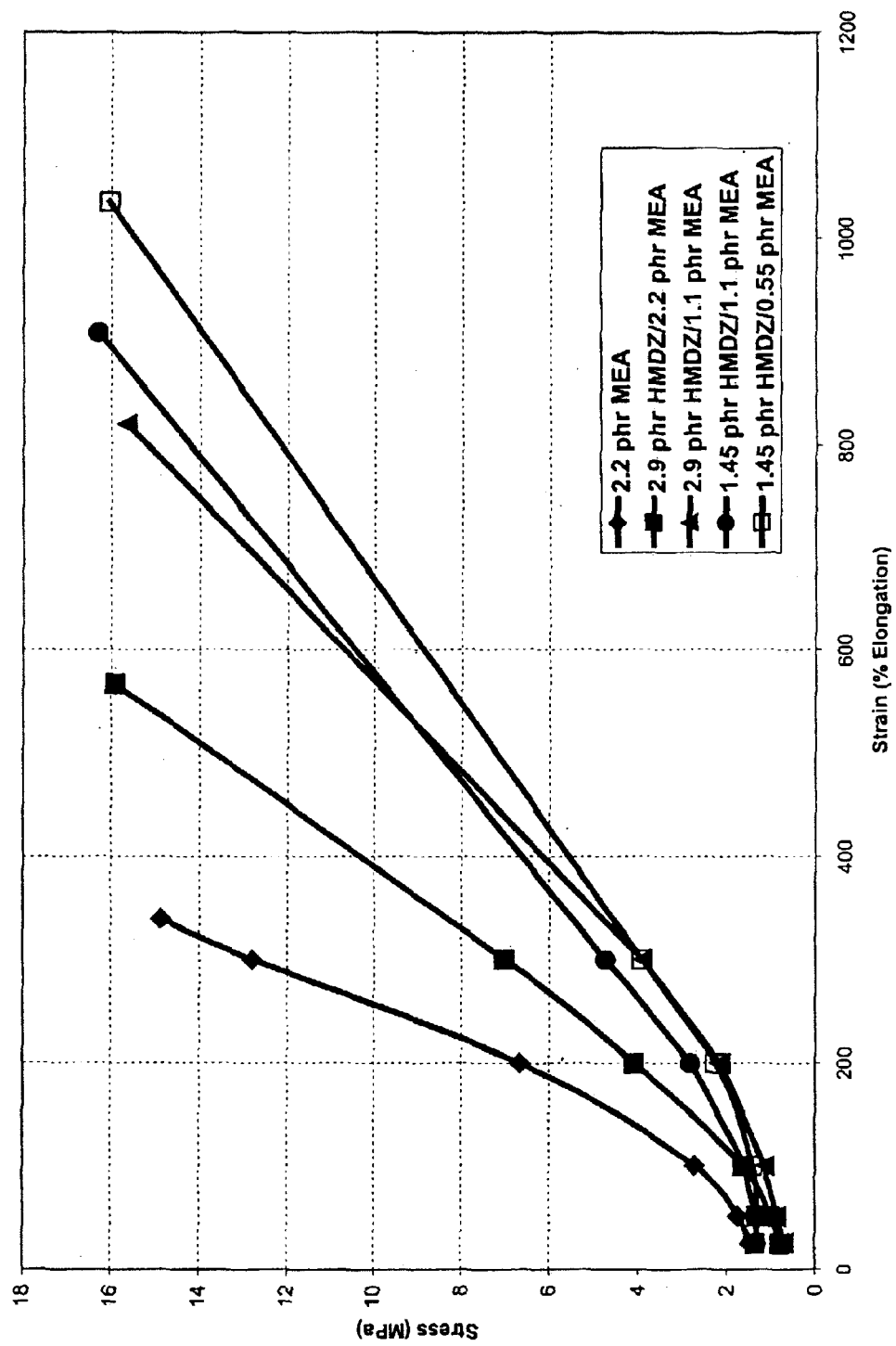
FIG. 4 is a graph of the stress/strain curves of filled halobutyl elastomer compounds, which contain HMDZ and MEA, according to the present invention, and to a filled halobutyl elastomer compound which does not contain HMZD.
Figure 5:
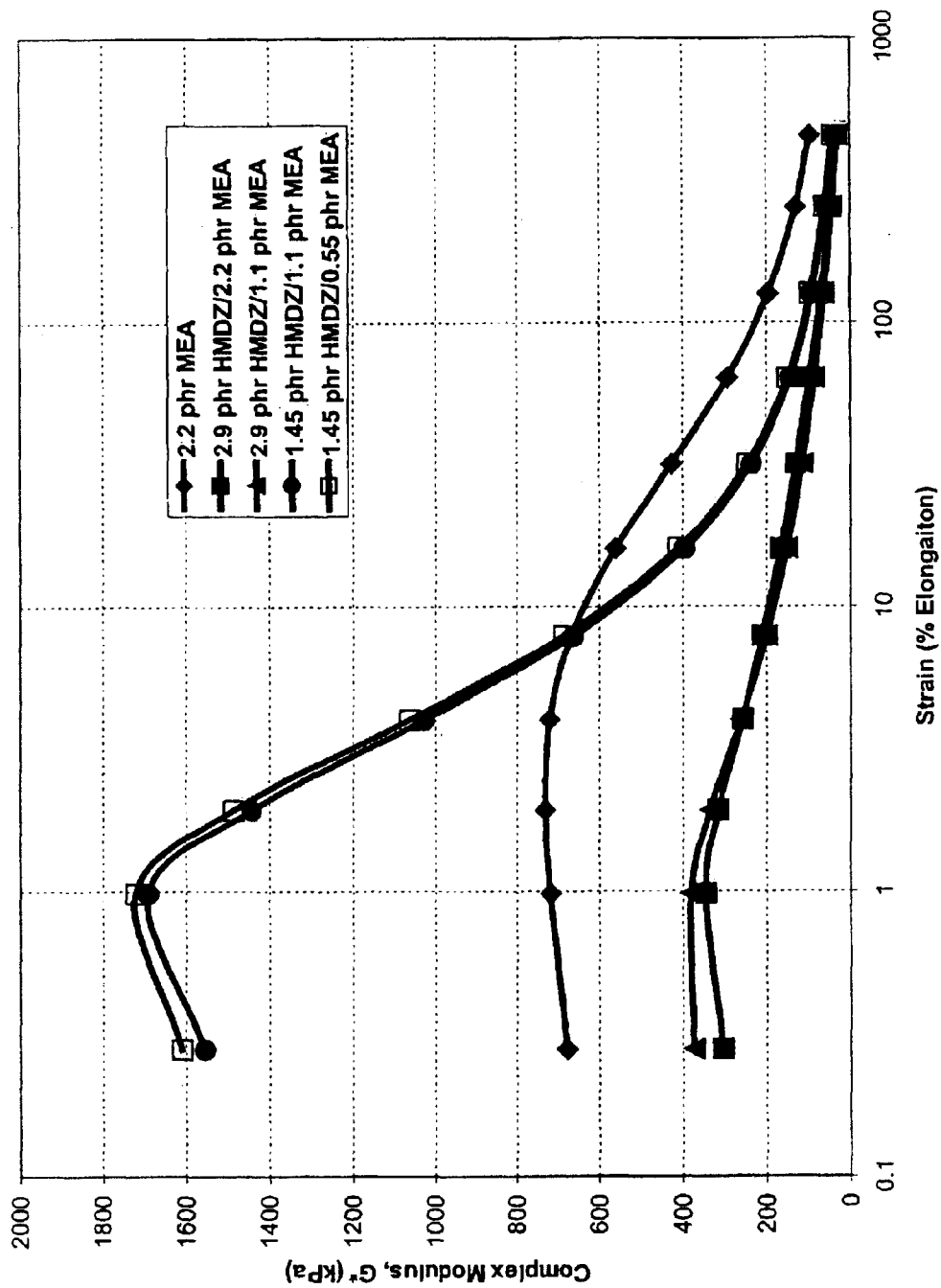
FIG. 5 is a graph of the complex modulus/strain curves of filled halobutyl elastomer compounds, which contain HMDZ and MEA, according to the present invention, and to a filled halobutyl elastomer compound which does not contain HMZD.

The data in Table 3 shows the effect of adding HMDZ and MEA to assist in the bonding and dispersion of the filler in the brominated butyl elastomer. While the M300/M100 for the control compound is 1.97, the compounds containing HMDZ and MEA possess M300/M100 values ranging from 2.79 to 4.30 (See FIG. 4). Additionally, a significant improvement in filler dispersion is observed on the addition of HMDZ and MEA to brominated butyl rubber/silica compounds. Specifically, for the control compound, the G* value is 2934 MPa while for the compounds containing HMDZ and MEA, this value ranges from 304 to 1609 MPa (See FIG. 5). The incorporation of 2.9 phr of HMDZ and 2.2 phr of MEA or 2.9 phr of HMDZ and 1.1 phr of MEA is seen to improve the degree of filler dispersion over what is observed for the compound which only contains MEA.

While the data in Table 3 suggests the addition of HMDZ into halogenated butyl elastomer/silica/MEA compounds lowers the M300/M100 values and increases the DIN abrasion volume loss, it is important to note the significant improvement in scorch safety as evidence by the increased t03 times.

From the data presented in Table 4, the positive effects of HMDZ and MEA on the tan δ value at 0° C. and the G" value at 60° C. are seen. While the control compound possesses a tan δ (0° C.) of 0.23 and a G" (60° C.) value of 3.33 MPa, compounds containing HMDZ and MEA possess tan δ (0° C.) values ranging from 0.43 to 0.85 and G" (60° C.) values ranging from 1.10 to 2.39 MPa. Furthermore, compounds which contain 2.9 phr of HMDZ and 2.2 phr of MEA and compounds which contain 2.9 phr of HMDZ and 1.1 phr of MEA possess superior tan δ (0° C.) and G" (60° C.) values than does the halogenated butyl elastomer/silica compound which only contains MEA.

Example 3

This example investigates the effect of incorporating mixtures of HMDZ and monoethanolamine (MEA) into halogenated butyl elastomer/silica compounds prepared on a 6"×12" mill.

Brominated isoprene isobutylene rubber (BIIR) was mixed with the additives and 60 parts per hundred rubber (phr) of silica filler (HiSil 233) on a 6"×12" mill under the mixing conditions described above. Identical curative ingredients (1 phr of stearic acid, 0.5 phr of sulfur, and 1.5 phr of ZnO) were then added to each of these compounds on a cool mill. The compounds were then cured for either $t_{c(90)}+10$ minutes at 170° C. (for DIN Abrasion testing) or $t_{c(90)}+5$ minutes at 170° C. and tested. Tables 5 and 6 gives the product compositions, and physical property data for the HMDZ/MEA containing compounds and for a compound containing only MEA.

Figure 6:
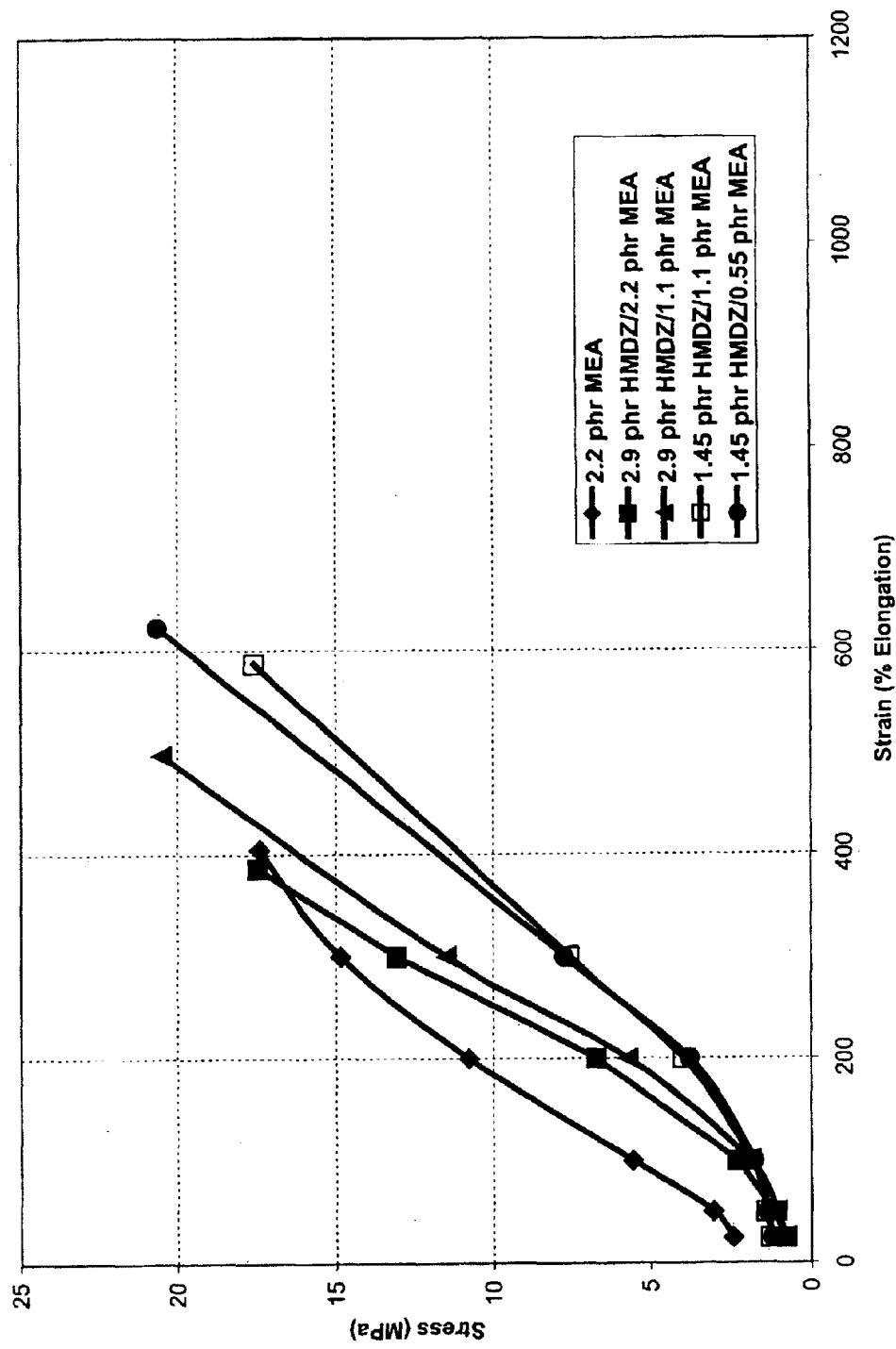
FIG. 6 is a graph of the stress/strain curves of filled halobutyl elastomer compounds, which contain HMDZ and MEA and were prepared on a 6"×12" mill, according to the present invention, and to a filled halobutyl elastomer compound which does not contain HMZD.
Figure 7:
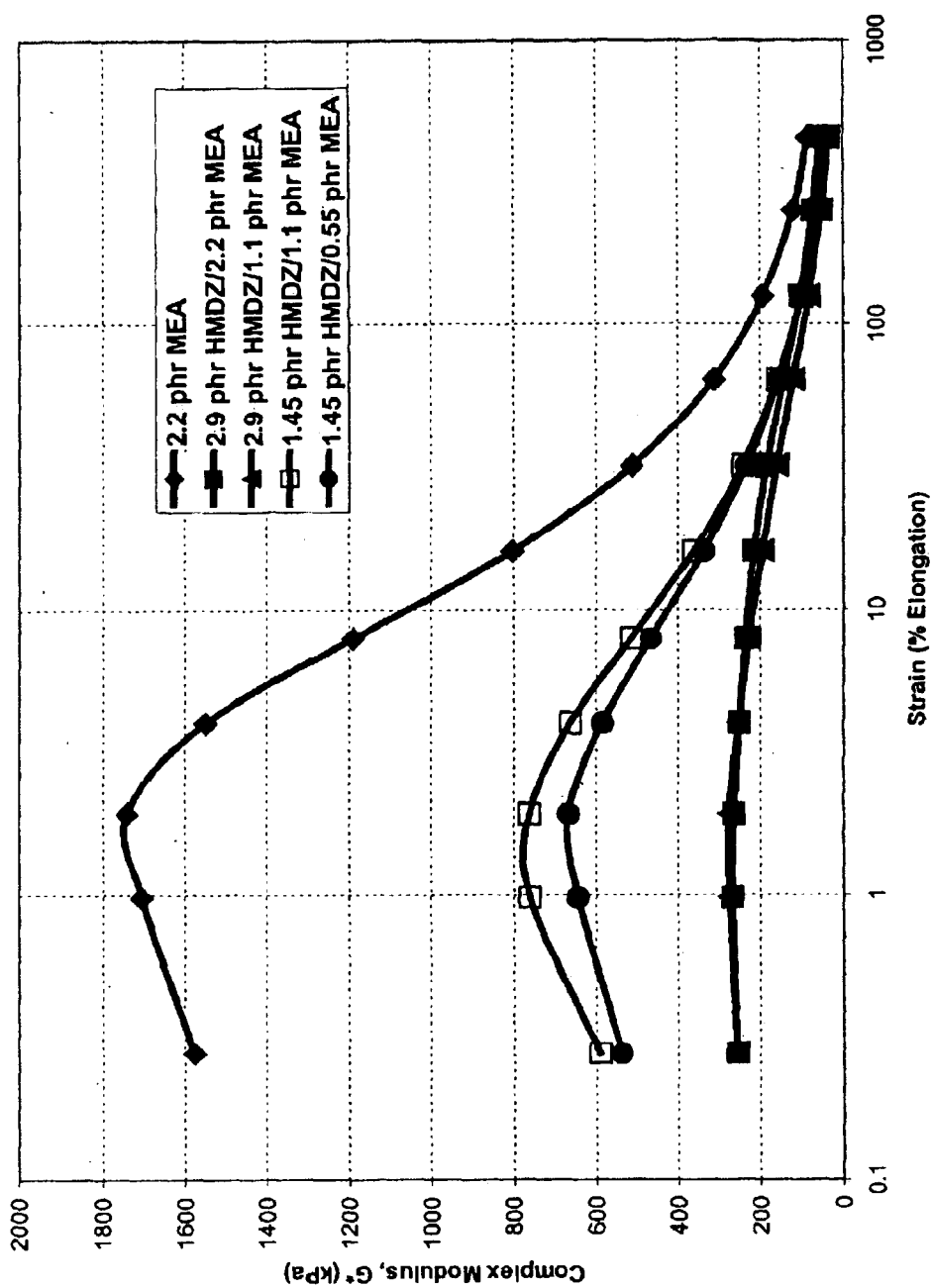
FIG. 7 is a graph of the complex modulus/strain curves of filled halobutyl elastomer compounds, which contain HMDZ and MEA and were prepared on a 6"×12" mill, according to the present invention, and to a filled halobutyl elastomer compound which does not contain HMZD.

The data in Table 5 shows the effect of adding HMDZ and MEA to assist in the bonding and dispersion of the filler in the brominated butyl elastomer. While the M300/M100 for the control compound is 1.97, the compounds containing HMDZ and MEA possess M300/M100 values ranging from 4.02 to 6.00. (See FIG. 6). Additionally, a significant improvement in filler dispersion is observed on the addition of HMDZ and MEA to brominated butyl rubber/silica compounds. Specifically, for the control compound, the G* value is 2934 MPa while for the compounds containing HMDZ and MEA, this value ranges from 256 to 538 MPa (See FIG. 7). The incorporation of HMDZ in conjunction with MEA is seen to improve both the degree of reinforcement (M300/M100) and of filler dispersion (G* at low strains) over what is observed for the compound which contains only MEA.

The data in Table 5 also suggests that the addition of HMDZ into halogenated butyl elastomer/silica/MEA compounds lowers the DIN abrasion volume loss when compared to both the control compound and the compound which contains only MEA.

From the data presented in Table 6, the positive effects of HMDZ and MEA on the tan δ value at 0° C. and the G" value at 60° C. are seen. While the control compound possesses a tan δ (0° C.) of 0.23 and a G" (60° C.) of 3.33 MPa, compounds containing HMDZ and MEA possess tan δ (0° C.) values ranging from 0.50 to 0.86 and G" (60° C.) values ranging from 0.69 to 1.78 MPa. Furthermore, compounds which contain both HMDZ and MEA possess superior tan δ (0° C.) and G" (60° C.) values than does the halogenated butyl elastomer/silica compound which contains only MEA.

Example 4

This example investigates the effect of incorporating mixtures of HMDZ and N,N-dimethylaminoethanol (DMAE) into halogenated butyl elastomer/silica compounds prepared in a Banbury.

Brominated isoprene isobutylene rubber (BIIR) was mixed with the additives and 60 parts per hundred rubber (phr) of silica filler (HiSil 233) in a tangential Banbury mixer under the mixing conditions described above. Identical curative ingredients (1 phr of stearic acid, 0.5 phr of sulfur, and 1.5 phr of ZnO) were then added on a cool mill to each of these compounds. The compounds were then cured for either $t_{c(90)}$+10 minutes at 170° C. (for DIN Abrasion testing) or $t_{c(90)}$+5 minutes at 170° C. and tested. Tables 7 and 8 give the product compositions, and physical property data for the HMDZ/DMAE containing compounds and for a compound containing only DMAE.

Figure 8:
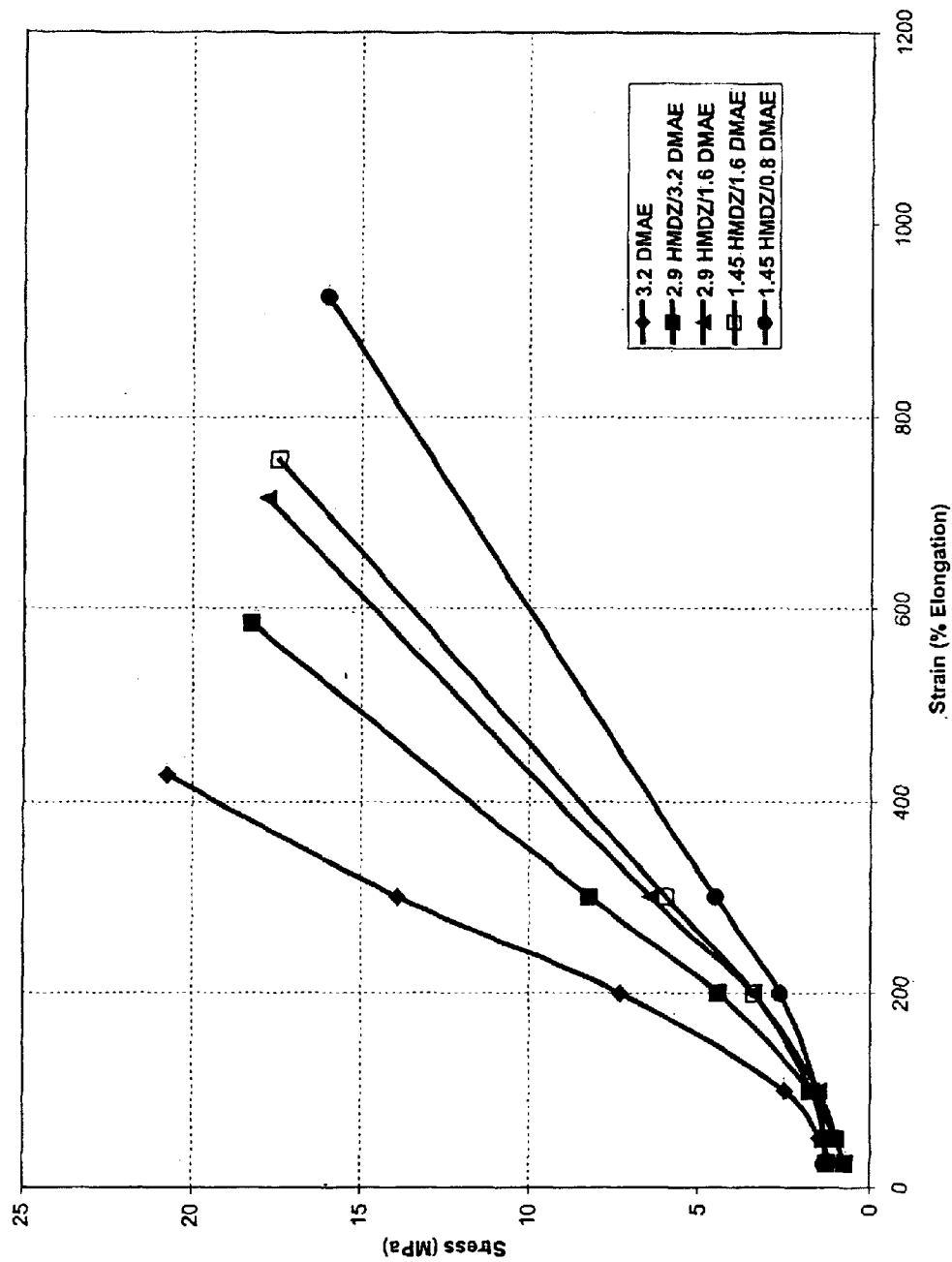
FIG. 8 is a graph of the stress/strain curves of filled halobutyl elastomer compounds, which contain HMDZ and DMEA and were prepared in a Banbury mixer, according to the present invention, and to a filled halobutyl elastomer compound which does not contain HMZD.
Figure 9:
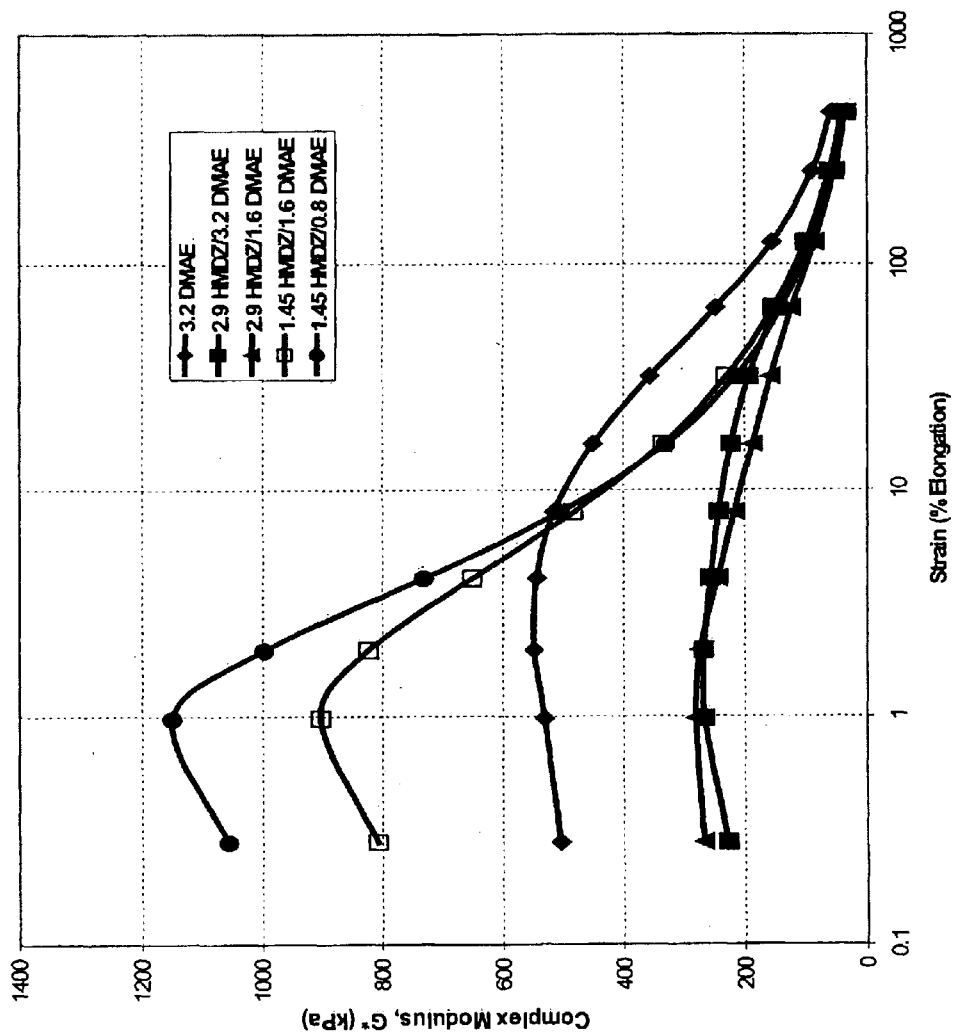
FIG. 9 is a graph of the complex modulus/strain curves of filled halobutyl elastomer compounds, which contain HMDZ and DMEA and were prepared in a Banbury mixer, according to the present invention, and to a filled halobutyl elastomer compound which does not contain HMZD.

The data in Table 7 shows the effect of adding HMDZ and DMAE to assist in the bonding and dispersion of the filler in the brominated butyl elastomer. While the M300/M100 for the control compound is 1.97, the compounds containing HMDZ and DMAE possess M300/M100 values ranging from 2.93 to 4.27. (See FIG. 8). Additionally, a significant improvement in filler dispersion is observed on the addition of HMDZ and DMAE to brominated butyl rubber/silica compounds. Specifically, for the control compound, the G* value is 2934 MPa while for the compounds containing HMDZ and MEA, this value ranges from 227 to 1056 MPa (See FIG. 9). The incorporation of 2.9 phr of HMDZ and 3.2 phr of DMAE or 2.9 phr of HMDZ and 1.6 phr of DMAE is seen to improve the degree of filler dispersion over what is observed for the compound which contains only DMAE.

While the data in Table 7 suggests the addition of HMDZ into halogenated butyl elastomer/silica/DMAE compounds lowers the M300/M100 values and increases the DIN abrasion volume loss, it is important to note the significant improvement in scorch safety as evidence by the increased t03 times possessed by these compounds.

From the data presented in Table 8, the positive effects of HMDZ and DMAE on the tan δ value at 0° C. and the G" value at 60° C. are seen. While the control compound possesses a tan δ (0° C.) of 0.23 and a G" (60° C.) of 3.33 MPa, compounds containing HMDZ and DMAE possess tan δ (0° C.) values ranging from 0.45 to 0.82 and G" (60° C.) values ranging from 0.48 to 2.31 MPa. Furthermore, compounds which contain 2.9 phr of HMDZ and 3.2 phr of DMAE or 2.9 phr of HMDZ and 1.6 phr of DMAE possess superior tan δ (0° C.) and G" (60° C.) values than does the halogenated butyl elastomer/silica compound which contains only DMAE.

Example 5

This example investigates the effect of incorporating mixtures of HMDZ and N,N-dimethylaminoethanol (DMAE) into halogenated butyl elastomer/silica compounds prepared on a 6"×12" mill.

Brominated isoprene isobutylene rubber (BIIR) was mixed with the additives and 60 parts per hundred rubber (phr) of silica filler (HiSil 233) on a 6"×12" mill under the mixing conditions described above. Identical curative ingredients (1 phr of stearic acid, 0.5 phr of sulfur, and 1.5 phr of ZnO) were then added on a cool mill to each of these compounds. The compounds were then cured for either $t_{c(90)}$+10 minutes at 170° C. (for DIN Abrasion testing) or $t_{c(90)}$+5 minutes at 170° C. and tested. Tables 9 and 10 give the product compositions and physical property data for the HMDZ/DMAE containing compounds and for a compound containing only DMAE.

Figure 10:
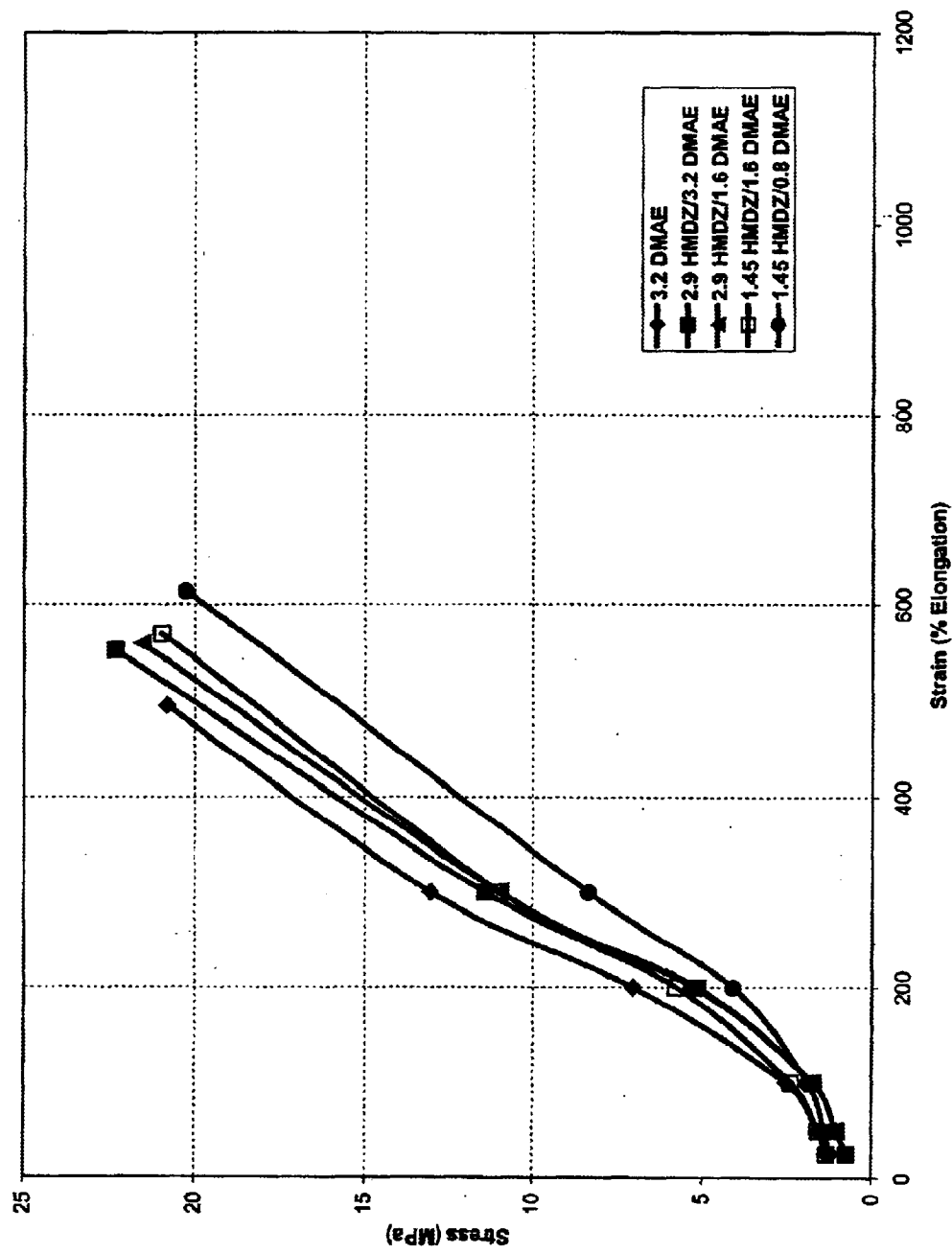
FIG. 10 is a graph of the stress/strain curves of filled halobutyl elastomer compounds, which contain HMDZ and DMEA and were prepared on a 6"×12" mill, according to the present invention, and to a filled halobutyl elastomer compound which does not contain HMZD.
Figure 11:
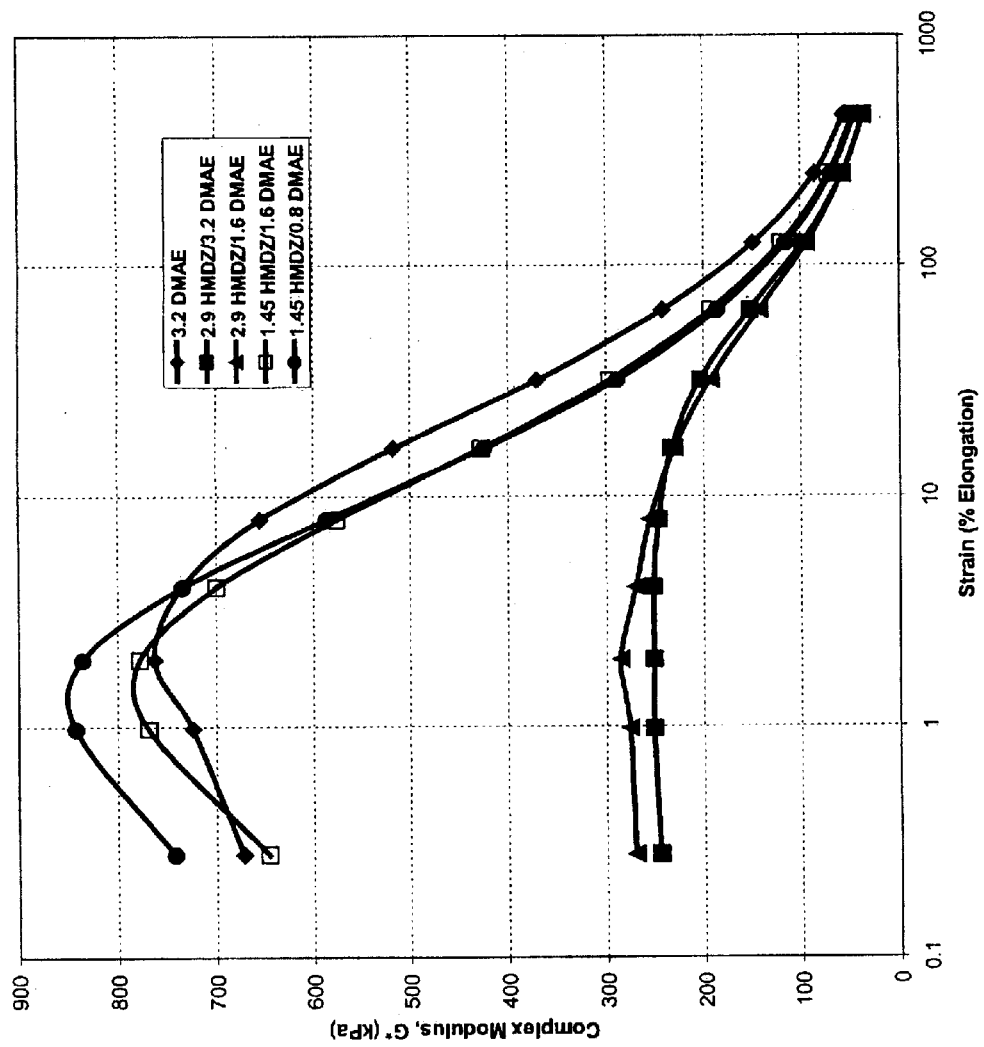
FIG. 11 is a graph of the complex modulus/strain curves of filled halobutyl elastomer compounds, which contain HMDZ and DMEA and were prepared on a 6"×12" mill, according to the present invention, and to a filled halobutyl elastomer compound which does not contain HMZD.

The data in Table 9 shows the effect of adding HMDZ and DMAE to assist in the bonding and dispersion of the filler in the brominated butyl elastomer. While the M300/M100 for the control compound is 1.97, the compounds containing HMDZ and DMAE possess M300/M100 values ranging from 4.41 to 6.55. (See FIG. 10). Additionally, a significant improvement in filler dispersion is observed on the addition of HMDZ and DMAE to brominated butyl rubber/silica compounds. Specifically, for the control compound, the G* value is 2934 MPa while for the compounds containing HMDZ and MEA, this value ranges from 245 to 742 MPa (See FIG. 11). The incorporation of 2.9 phr of HMDZ and 3.2 phr of DMAE or 2.9 phr of HMDZ and 1.6 phr of DMAE is seen to improve both the degree of reinforcement (M300/M100) and of filler dispersion (G* at low strains) over what is observed for the compound which contains only DMAE.

The Mooney Scorch data presented in Table 9 also illustrates the positive impact on the t03 times (increased t03 times imply improved processability) observed on addition of HMDZ to halogenated butyl elastomer/silica/DMAE compounds.

From the data presented in Table 10, the positive effects of HMDZ and DMAE on the tan δ value at 0° C. and the G" value at 60° C. are seen. While the control compound possesses a tan δ (0° C.) of 0.23 and a G" (60° C.) of 3.33 MPa, compounds containing HMDZ and DMAE possess tan δ (0° C.) values ranging from 0.56 to 0.86 and G" (60° C.) values ranging from 0.42 to 1.61 MPa. Furthermore, compounds which contain 2.9 phr of HMDZ and 3.2 phr of DMAE or 2.9 phr of HMDZ and 1.6 phr of DMAE possess superior tan δ (0° C.) and G" (60° C.) values than does the halogenated butyl elastomer/silica compound which contains only DMAE.

TABLE 1

| | Example | | | |
|---|---|---|---|---|
| | 1a | 1b | 1c | 1d |
| Additives | HMDZ | HMDZ | HMDZ | Control |
| Additives (phr) | 5.8 | 2.9 | 1.45 | 0 |
| STRESS STRAIN (Die C DUMBELLS, cured for tc90 + 5 min, tested @ 23° C.) | | | | |
| Hard. Shore A2 Inst. (pts.) | 51 | 60 | 67 | 80 |
| Ultimate Tensile (MPa) | 18.27 | 18.7 | 17.76 | 11.22 |
| Ultimate Elongation (%) | 876 | 800 | 752 | 894 |
| Strain (% Elongation) | Stress (MPa) | Stress (MPa) | Stress (MPa) | Stress (MPa) |
| 25 | 0.6 | 0.86 | 1.2 | 2.1 |
| 50 | 0.77 | 1 | 1.25 | 2.02 |
| 100 | 1.05 | 1.28 | 1.48 | 1.97 |
| 200 | 2.02 | 2.49 | 2.79 | 2.62 |
| 300 | 4.07 | 5.28 | 5.56 | 3.89 |
| 300/100 | 3.88 | 4.13 | 3.76 | 1.97 |
| DIN ABRASION (cured for tc90 + 10 min @ 170° C.) | | | | |
| Abrasion Volume Loss (mm$^3$) | 282 | 190 | 189 | 283 |
| COMPOUND MOONEY SCORCH (Small rotor, tested @ 130° C.) | | | | |
| t Value t03 (min) | 10.26 | 15.23 | 11.89 | 2.52 |
| t Value t18 (min) | 24.21 | 22.23 | 14.78 | 9.34 |
| t Value t18 – t03 (min) | 13.95 | 7 | 2.89 | 6.82 |
| MDR CURE CHARACTERISTICS (tested @ 170° C., 1° arc, 1.7 Hz) | | | | |
| MH (dN · m) | 18.08 | 24.27 | 28.77 | 32.04 |
| ML (dN · m) | 3.71 | 5.12 | 8.28 | 17.86 |
| Delta t'50—t'10 (min) | 4.36 | 3.92 | 3.19 | 8.33 |
| RPA PAYNE EFFECT (tested @ 100° C., 30 cpm) | | | | |
| | G* | G* | G* | G* |
| Strain % | kPa | kPa | kPa | kPa |
| 0.28 | 365.97 | 466.02 | 631.4 | 2934 |
| 0.98 | 413.78 | 520.18 | 721.14 | 3134 |

TABLE 2

| | Example | | | |
|---|---|---|---|---|
| | 1a | 1b | 1c | 1d |
| Additives | HMDZ | HMDZ | HMDZ | Control |
| Additives (phr) | 5.8 | 2.9 | 1.45 | 0 |
| GABO (cured for tc90+5 @ 170° C., test run from –100° C. to 100° C.) | | | | |
| Tan δ @ 0° C. | 0.88 | 0.68 | 0.49 | 0.23 |
| Tan δ @ 60° C. | 0.23 | 0.21 | 0.17 | 0.08 |
| G" @ 60° C. (MPa) | 0.93 | 1.37 | 1.98 | 3.33 |

TABLE 3

| | Example | | | | |
|---|---|---|---|---|---|
| | 2a | 2b | 2c | 2d | 2e |
| Additives | MEA | HMDZ/MEA | HMDZ/MEA | HMDZ/MEA | HMDZ/MEA |
| Additives (phr) | 2.2 | 2.9/2.2 | 2.9/1.1 | 1.45/1.1 | 1.45/0.55 |
| STRESS STRAIN (Die C DUMBELLS, cured for tc90 + 5 min, tested @ 23° C.) | | | | | |
| Hard. Shore A2 Inst. (pts.) | 71 | 56 | 53 | 70 | 70 |
| Ultimate Tensile (MPa) | 14.88 | 15.91 | 15.66 | 16.29 | 16.05 |
| Ultimate Elongation (%) | 340 | 567 | 821 | 909 | 1036 |
| Strain (% Elongation) | Stress (MPa) | Stress (MPa) | Stress (MPa) | Stress (MPa) | Stress (MPa) |
| 25 | 1.46 | 0.773 | 0.689 | 1.3 | 1.34 |
| 50 | 1.75 | 0.999 | 0.854 | 1.34 | 1.3 |
| 100 | 2.71 | 1.63 | 1.13 | 1.58 | 1.4 |

TABLE 3-continued

|  | Example | | | | |
|---|---|---|---|---|---|
|  | 2a | 2b | 2c | 2d | 2e |
| 200 | 6.66 | 4.08 | 2.14 | 2.79 | 2.23 |
| 300 | 12.79 | 7.01 | 3.89 | 4.73 | 3.91 |
| 300/100 | 4.72 | 4.30 | 3.44 | 2.99 | 2.79 |
| DIN ABRASION (cured for tc90 + 10 min @ 170° C.) | | | | | |
| Abrasion Volume Loss ($mm^3$) | 232 | 303 | 341 | 292 | 291 |
| COMPOUND MOONEY SCORCH (Small rotor, tested @ 130° C.) | | | | | |
| t Value t03 (min) | 0.09 | 3.02 | 7.14 | 6.27 | 11.35 |
| t Value t18 (min) | 1.71 | 4.38 | 11.89 | 10.81 | 21.92 |
| t Value t18 − t03 (min) | 1.62 | 1.36 | 4.75 | 4.54 | 10.57 |
| MDR CURE CHARACTERISTICS (tested @ 170° C., 1° arc, 1.7 Hz) | | | | | |
| MH (dN · m) | 34.61 | 21.64 | 18.67 | 32.74 | 31.44 |
| ML (dN · m) | 9.24 | 3.71 | 3.35 | 6.63 | 7.4 |
| Delta t'50—t'10 (min) | 2.64 | 4.3 | 5.98 | 3.51 | 4.04 |
| RPA PAYNE EFFECT (tested @ 100° C., 30 cpm) | | | | | |
| Strain | G* | G* | G* | G* | G* |
| % | kPa | KPa | kPa | kPa | kPa |
| 0.28 | 676.38 | 304.68 | 374.25 | 1555 | 1609.8 |
| 0.98 | 717.37 | 346.05 | 381.16 | 1691.1 | 1720.9 |

TABLE 4

|  | Example | | | | |
|---|---|---|---|---|---|
|  | 2a | 2b | 2c | 2d | 2e |
| Additives | MEA | HMDZ/MEA | HMDZ/MEA | HMDZ/MEA | HMDZ/MEA |
| Additives (phr) | 2.2 | 2.9/2.2 | 2.9/1.1 | 1.45/1.1 | 1.45/0.55 |
| GABO (cured for tc90 + 5 @ 170° C., test run from −100° C. to 100° C.) | | | | | |
| Tan δ @ 0° C. | 0.50 | 0.82 | 0.85 | 0.45 | 0.43 |
| Tan δ @ 60° C. | 0.11 | 0.20 | 0.23 | 0.14 | 0.14 |
| G" @ 60° C. (MPa) | 1.61 | 1.13 | 1.10 | 2.32 | 2.39 |

TABLE 5

|  | Example | | | | |
|---|---|---|---|---|---|
|  | 3a | 3b | 3c | 3d | 3e |
| Additives | MEA | HMDZ/MEA | HMDZ/MEA | HMDZ/MEA | HMDZ/MEA |
| Additives (phr) | 2.2 | 2.9/2.2 | 2.9/1.1 | 1.45/1.1 | 1.45/0.55 |
| STRESS STRAIN (Die C DUMBELLS, cured for tc90 + 5 min, tested @ 23° C.) | | | | | |
| Hard. Shore A2 Inst. (pts.) | 80 | 55 | 55 | 67 | 65 |
| Ultimate Tensile (MPa) | 17.4 | 17.45 | 20.5 | 17.57 | 20.63 |
| Ultimate Elongation (%) | 405 | 387 | 498 | 588 | 624 |
| Strain (% Elongation) | Stress (MPa) | Stress (MPa) | Stress (MPa) | Stress (MPa) | Stress (MPa) |
| 25 | 2.42 | 0.8 | 0.79 | 1.28 | 1.21 |
| 50 | 3.04 | 1.2 | 1.09 | 1.41 | 1.37 |
| 100 | 5.54 | 2.28 | 1.92 | 1.88 | 1.79 |
| 200 | 10.78 | 6.69 | 5.69 | 3.98 | 3.77 |
| 300 | 14.86 | 13.07 | 11.52 | 7.56 | 7.75 |
| 300/100 | 2.68 | 5.73 | 6.00 | 4.02 | 4.33 |
| DIN ABRASION (cured for tc90 + 10 min @ 170° C.) | | | | | |
| Abrasion Volume Loss ($mm^3$) | 263 | 181 | 159 | 213 | 174 |
| COMPOUND MOONEY SCORCH (Small rotor, tested @ 130° C.) | | | | | |
| t Value t03 (min) | 3.9 | 0.09 | 3.47 | 4.13 | 10.98 |
| t Value t18 (min) | 5.32 | 0.95 | 6.71 | 6.34 | 16.73 |
| t Value t18 − t03 (min) | 1.42 | 0.86 | 3.24 | 2.21 | 5.75 |
| MDR CURE CHARACTERISTICS (tested @ 170° C., 1° arc, 1.7 Hz) | | | | | |
| MH (dN · m) | 45.93 | 17.5 | 20.06 | 32.39 | 31.04 |
| ML (dN · m) | 12.83 | 4.86 | 4.52 | 7.18 | 7.83 |
| Delta t'50—t'10 (min) | 1.21 | 3.4 | 3.42 | 2.45 | 2.55 |

TABLE 5-continued

| | Example | | | | |
|---|---|---|---|---|---|
| | 3a | 3b | 3c | 3d | 3e |
| RPA PAYNE EFFECT (tested @ 100° C., 30 cpm) | | | | | |
| Strain | G* | G* | G* | G* | G* |
| % | kPa | kPa | kPa | kPa | kPa |
| 0.28 | 1577.2 | 256.55 | 255.86 | 590.43 | 537.89 |

TABLE 6

| | Example | | | | |
|---|---|---|---|---|---|
| | 3a | 3b | 3c | 3d | 3e |
| Additives | MEA | HMDZ/MEA | HMDZ/MEA | HMDZ/MEA | HMDZ/MEA |
| Additives (phr) | 2.2 | 2.9/2.2 | 2.9/1.1 | 1.45/1.1 | 1.45/0.55 |
| GABO (cured for tc90 + 5 @ 170° C., test run from −100° C. to 100° C.) | | | | | |
| Tan δ @ 0° C. | 0.28 | 0.84 | 0.86 | 0.50 | 0.56 |
| Tan δ @ 60° C. | 0.08 | 0.16 | 0.18 | 0.14 | 0.14 |
| G" @ 60° C. (MPa) | 2.91 | 0.69 | 0.88 | 1.78 | 1.59 |

TABLE 7

| | Example | | | | |
|---|---|---|---|---|---|
| | 4a | 4b | 4c | 4d | 4e |
| Additives | DMAE | HMDZ/DMAE | HMDZ/DMAE | HMDZ/DMAE | HMDZ/DMAE |
| Additives (phr) | 3.2 | 2.9/3.2 | 2.9/1.6 | 1.45/1.6 | 1.45/0.8 |
| STRESS STRAIN (Die C DUMBELLS, cured for tc90 + 5 min, tested @ 23° C.) | | | | | |
| Hard. Shore A2 Inst. (pts.) | 64 | 54 | 54 | 69 | 70 |
| Ultimate Tensile (MPa) | 20.73 | 18.26 | 17.79 | 17.45 | 15.97 |
| Ultimate Elongation (%) | 428 | 585 | 715 | 756 | 924 |
| Strain (% Elongation) | Stress (MPa) | Stress (MPa) | Stress (MPa) | Stress (MPa) | Stress (MPa) |
| 25 | 1.13 | 0.734 | 0.74 | 1.26 | 1.32 |
| 50 | 1.47 | 1.05 | 1 | 1.36 | 1.34 |
| 100 | 2.48 | 1.73 | 1.5 | 1.7 | 1.54 |
| 200 | 7.29 | 4.42 | 3.39 | 3.37 | 2.6 |
| 300 | 13.91 | 8.21 | 6.41 | 5.96 | 4.51 |
| 300/100 | 5.61 | 4.21 | 4.27 | 3.51 | 2.93 |
| DIN ABRASION (cured for tc90 + 10 min @ 170° C.) | | | | | |
| Abrasion Volume Loss (mm³) | 156 | 161 | 204 | 236 | 243 |
| COMPOUND MOONEY SCORCH (Small rotor, tested @ 130° C.) | | | | | |
| t Value t03 (min) | 0.32 | 4.86 | 7.17 | 7.85 | 13.6 |
| t Value t18 (min) | 4.7 | 7.4 | 12.93 | 13.13 | 25.93 |
| t Value t18 − t03 (min) | 4.38 | 2.54 | 5.76 | 5.28 | 12.33 |
| MDR CURE CHARACTERISTICS (tested @ 170° C., 1° arc, 1.7 Hz) | | | | | |
| MH (dN · m) | 29.01 | 22.74 | 21.3 | 32.91 | 32.19 |
| ML (dN · m) | 8.91 | 5.17 | 4.38 | 5.79 | 5.74 |
| Delta t'50—t'10 (min) | 2.08 | 3.06 | 4.87 | 3.72 | 4.67 |
| RPA PAYNE EFFECT (tested @ 100° C., 30 cpm) | | | | | |
| Strain | G* | G* | G* | G* | G* |
| % | kPa | kPa | kPa | kPa | kPa |
| 0.28 | 504.7 | 227.53 | 267.66 | 806.94 | 1056.2 |
| 0.98 | 531.22 | 266.22 | 280.89 | 901.32 | 1149.6 |

TABLE 8

| | Example | | | | |
|---|---|---|---|---|---|
| | 4a | 4b | 4c | 4d | 4e |
| Additives | DMAE | HMDZ/DMAE | HMDZ/DMAE | HMDZ/DMAE | HMDZ/DMAE |
| Additives (phr) | 3.2 | 2.9/3.2 | 2.9/1.6 | 1.45/1.6 | 1.45/0.8 |
| GABO (cured for tc90 + 5 @ 170° C., test run from −100° C. to 100° C.) | | | | | |
| Tan δ @ 0° C. | 0.70 | 0.82 | 0.84 | 0.56 | 0.45 |
| Tan δ @ 60° C. | 0.10 | 0.11 | 0.14 | 0.14 | 0.14 |
| G" @ 60° C. (MPa) | 0.80 | 0.48 | 0.66 | 1.61 | 2.31 |

TABLE 9

| | Example | | | | |
|---|---|---|---|---|---|
| | 5a | 5b | 5c | 5d | 5e |
| Additives | DMAE | HMDZ/DMAE | HMDZ/DMAE | HMDZ/DMAE | HMDZ/DMAE |
| Additives (phr) | 3.2 | 2.9/3.2 | 2.9/1.6 | 1.45/1.6 | 1.45/0.8 |
| STRESS STRAIN (Die C DUMBELLS, cured for tc90 + 5 min, tested @ 23° C.) | | | | | |
| Hard. Shore A2 Inst. (pts.) | 68 | 53 | 53 | 67 | 65 |
| Ultimate Tensile (MPa) | 20.81 | 22.32 | 21.53 | 20.96 | 20.26 |
| Ultimate Elongation (%) | 494 | 552 | 559 | 569 | 614 |
| Strain (% Elongation) | Stress (Mpa) | Stress (MPa) | Stress (MPa) | Stress (MPa) | Stress (MPa) |
| 25 | 1.36 | 0.73 | 0.75 | 1.33 | 1.24 |
| 50 | 1.61 | 1.04 | 1.04 | 1.58 | 1.4 |
| 100 | 2.52 | 1.74 | 1.73 | 2.39 | 1.89 |
| 200 | 7.03 | 5.25 | 5.15 | 5.76 | 4.09 |
| 300 | 13.04 | 11.4 | 10.97 | 10.96 | 8.33 |
| 300/100 | 5.17 | 6.55 | 6.34 | 4.59 | 4.41 |
| DIN ABRASION (cured for tc90 + 10 min @ 170° C.) | | | | | |
| Abrasion Volume Loss (mm³) | 171 | 218 | 245 | 161 | 154 |
| COMPOUND MOONEY SCORCH (Small rotor, tested @ 130° C.) | | | | | |
| t Value t03 (min) | | 0.12 | 11.5 | 20.18 | 8.89 | 26.49 |
| t Value t18 (min) | | 5.23 | 23.24 | >30 | 20.97 | 30 |
| t Value t18 − t03 (min) | | 5.11 | 11.74 | NR | 12.08 | NR |
| MDR CURE CHARACTERISTICS (tested @ 170° C., 1° arc, 1.7 Hz) | | | | | |
| MH (dN · m) | 35.72 | 19.81 | 19.55 | 34.52 | 30.34 |
| ML (dN · m) | 10.39 | 5.81 | 5.12 | 9.17 | 9.09 |
| Delta t'50—t'10 (min) | 2.61 | 8.09 | 8.49 | 3.79 | 3.98 |
| RPA PAYNE EFFECT (tested @ 100° C., 30 cpm) | | | | | |
| Strain | G* | G* | G* | G* | G* |
| % | kPa | kPa | kPa | kPa | kPa |
| 0.28 | 672.69 | 245.56 | 270.49 | 646.73 | 742.46 |
| 0.98 | 724.12 | 251.58 | 275.81 | 769.07 | 842.28 |

TABLE 10

| | Example | | | | |
|---|---|---|---|---|---|
| | 5a | 5b | 5c | 5d | 5e |
| Additives | DMAE | HMDZ/DMAE | HMDZ/DMAE | HMDZ/DMAE | HMDZ/DMAE |
| Additives (phr) | 3.2 | 2.9/3.2 | 2.9/1.6 | 1.45/1.6 | 1.45/0.8 |
| GABO (cured for tc90+5 @ 170° C., test run from −100° C. to 100° C.) | | | | | |
| Tan δ @ 0° C. | 0.55 | 0.86 | 0.86 | 0.56 | 0.56 |
| Tan δ @ 60° C. | 0.11 | 0.11 | 0.13 | 0.13 | 0.15 |
| G" @ 60° C. (MPa) | 1.40 | 0.42 | 0.53 | 1.46 | 1.61 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for preparing a filled halobutyl elastomer comprising:

admixing
(a) at least one halobutyl elastomer,
(b) at least one mineral filler, and (c) a mixture of at least one silazane compound and an additive which contains at least one hydroxyl group and at least one functional group having a basic amine group, and curing the resulting filled halobutyl elastomer mixture, wherein the amount of additive used in conjunction with the silazane compound is in the range of from 0.5 to 10 parts per hundred parts of elastomer.

2. The process according to claim 1, wherein the silazane compound is an organic silazane compound.

3. The process according to claim 2, wherein the silazane compound is a disilazane compound.

4. The process according to claim 3, wherein the silazane compound is hexamethyldisilazane, heptamethyldisilazane, 1,1,3,3-tetramethyl-disilazane, 1,3-bis(chloromethyl) tetramethyldisilazane, 1,3-divinyl-1,1,3,3-tetramethyldisilazane, or 1,3-diphenyltetramethyldisilazane.

5. The process according to claim 4, wherein the silazane compound is hexamethyldisilazane.

6. The process according to claim 1, wherein the mineral filler is silica, silicate, clay, gypsum, alumina, titanium dioxide, talc or a mixture thereof.

7. The process according to claim 1, wherein the halogenated butyl elastomer is a brominated butyl elastomer.

8. The process according to claim 1, wherein the additive is monoethanolamine or N,N-dimethyaminoalcohol.

9. The process according to claim 1, wherein the amount of filler is in the range from 20 parts to 250 parts by weight, per hundred parts of elastomer.

10. The process according to claim 9, wherein the amount of filler is in the range from 30 parts to 100 parts by weight, per hundred parts of elastomer.

11. The process according to claim 10, wherein the amount of filler is in the range from 40 parts to 80 parts by weight, per hundred parts of elastomer.

12. The process according to claim 1, wherein the amount of silazane is in the range of from 0.5 to 10 parts per hundred parts of elastomer.

13. The process according to claim 12, wherein the amount of silazane is in the range of from 1 to 6 parts per hundred parts of elastomer.

14. The process according to claim 13, wherein the amount of silazane is in the range of from 2 to 5 parts per hundred parts of elastomer.

15. The process according to claim 1, wherein the amount of additive used in conjunction with the silazane compound is in the range of from 1 to 3 parts per hundred parts of elastomer.

16. The process according to claim 1, wherein the at least one halobutyl elastomer is a mixture of a halogenated butyl elastomer and an additional elastomer.

17. The process according to claim 1, further comprising admixing (d) an additional elastomer, prior to curing.

18. A filled halobutyl elastomer composition comprising at least one halobutyl elastomer, at least one mineral filler and a mixture of at least one silazane compound and an additive which contains at least one hydroxyl group and at least one functional group having a basic amine group, wherein the amount of additive used in conjunction with the silazane compound is in the range of from 0.5 to 10 parts per hundred parts of elastomer.

19. A filled, cured halobutyl elastomer composition comprising at least one halobutyl elastomer, at least one mineral filler and a mixture of a at least one silazane compound and an additive which contains at least one hydroxyl group and at least one functional group having a basic amine group wherein the amount of additive used in conjunction with the silazane compound is in the range of from 0.5 to 10 parts per hundred parts of elastomer.

20. The composition according to claim 19, wherein the filled, cured halobutyl elastomer is a tire tread.

21. The composition according to claim 19, wherein the filled, cured halobutyl elastomer is an innerliner for a vehicle tire.

22. A method of improving the abrasion resistance of a filled, cured elastomer composition comprising:

admixing (a) at least one halobutyl elastomer, (b) at least one mineral filler, and (c) a mixture of a silazane compound and an additive which contains at least one hydroxyl group and at least one functional group having a basic amine group, and curing the resulting filled halobutyl elastomer mixture, wherein the amount of additive used in conjunction with the silazane compound is in the range of from 0.5 to 10 parts per hundred parts of elastomer.

* * * * *